(12) United States Patent
Waldman

(10) Patent No.: US 11,461,542 B2
(45) Date of Patent: Oct. 4, 2022

(54) PROVIDING ASYNCHRONOUS GENERAL USER INTERFACE (GUI) INPUT

(71) Applicant: ORACLE INTERNATIONAL CORPORATION, Redwood Shores, CA (US)

(72) Inventor: Jeanne Waldman, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/184,526

(22) Filed: Feb. 24, 2021

(65) Prior Publication Data

US 2021/0182474 A1    Jun. 17, 2021

Related U.S. Application Data

(63) Continuation of application No. 16/382,126, filed on Apr. 11, 2019, now Pat. No. 10,977,433.

(60) Provisional application No. 62/743,423, filed on Oct. 9, 2018.

(51) Int. Cl.
| | |
|---|---|
| *G06F 40/174* | (2020.01) |
| *G06F 3/0484* | (2022.01) |
| *G06F 40/226* | (2020.01) |
| *G06F 16/25* | (2019.01) |
| *G06F 16/27* | (2019.01) |
| *G06F 16/215* | (2019.01) |
| *G06F 16/958* | (2019.01) |
| *G06F 9/451* | (2018.01) |

(52) U.S. Cl.
CPC .......... *G06F 40/174* (2020.01); *G06F 3/0484* (2013.01); *G06F 9/451* (2018.02); *G06F 16/215* (2019.01); *G06F 16/252* (2019.01); *G06F 16/273* (2019.01); *G06F 16/972* (2019.01); *G06F 40/226* (2020.01)

(58) Field of Classification Search
CPC ...... G06F 40/174; G06F 40/226; G06F 40/10; G06F 40/103; G06F 3/0484; G06F 9/451; G06F 16/215; G06F 16/252; G06F 16/273

See application file for complete search history.

(56) References Cited

U.S. PATENT DOCUMENTS 9,323,819 B1 *    4/2016    McLeod ................. G06F 16/26
2003/0212740 A1 *   11/2003   Berrigan ............... G06F 40/226
                                                          709/203

(Continued)

*Primary Examiner* — Nicholas Ulrich
(74) *Attorney, Agent, or Firm* — Trellis IP Law Group, PC

(57) ABSTRACT

Asynchronous General User Interface (GUI) input is provided. A first user-provided input is receive for an input field of the General User Interface (GUI). A first local timing process and a global timing process are initiated indicating time of the receiving of the first user-provided input. Prior to completion of data entry processing of the first user-provided input, a second user-provided input is received for the input field and a second local timing processing is initiated indicating time of the second user-provided input is received for the input field. Data entry processing of the first user-provided input and the second user-provided input is performed. A choice is made between the first user-provided input and the second user-provided input for use of the input field based at least in part on the first local timing process, the second local timing process, and the global timing process.

18 Claims, 8 Drawing Sheets

(56) References Cited

U.S. PATENT DOCUMENTS

| | | | |
|---|---|---|---|
| 2010/0229052 A1* | 9/2010 | Cuneo | G06F 11/0709 |
| | | | 714/57 |
| 2011/0185282 A1* | 7/2011 | Mahmood | G06F 21/64 |
| | | | 715/744 |
| 2012/0215531 A1* | 8/2012 | Grobauer | G06F 3/038 |
| | | | 704/231 |
| 2017/0228443 A1* | 8/2017 | Smit | G06F 3/0481 |

* cited by examiner

PROVIDING ASYNCHRONOUS GENERAL USER INTERFACE (GUI) INPUT

CROSS REFERENCES TO RELATED APPLICATIONS

This application is a continuation of the following application, U.S. patent application Ser. No. 16/382,126, entitled SYSTEM AND METHOD FOR INPUT DATA VALIDATION AND CONVERSION, filed on Apr. 11, 2019, claims the benefit of U.S. Provisional Patent Application Ser. No. 62/743,423, entitled ASYNCHRONOUS VALIDATION AND CONVERSION SYSTEM FOR USER INTERFACE COMPONENTS, filed on Oct. 9, 2018, which is hereby incorporated by reference as if set forth in full in this application for all purposes.

BACKGROUND

Historically, many web components handle user data inputs synchronously. This typically means that the web component is not usable again by the user until current user input has finished data entry processing. Such waiting for the data entry processing to finish, when noticeable by the user, can frustrate the user by slowing their ability to input data quickly and efficiently.

Conventional solutions to waiting for processing include generating a wait indicator, which is designed to alert the user that their input is being processed. Such wait indicators are often representations of timers such as a clock symbol, rotating time elapse counter, wait animation, progress indicator, and the like. Such wait indicators are often useful to give the user feedback so that the user understands that data entry processing is underway. However, such wait indicators do not resolve the underlying problem of forcing the user to wait for such noticeable data processing latency before continuing.

Thus, what is needed is a system and method that reduces noticeable data entry wait times for user due to data processing time that provides a user with the ability to input data in a more robust fashion that minimizes, eliminates, or detaches noticeable data processing latency from user data input interactions.

SUMMARY

Implementations described herein provide feedback on errors, or changes, in an interactive fashion for the user based on web service data as an error, or changes, come back to the client asynchronously, without waiting for all the errors or changes for the web component to be complete. In some implementations, the web component may remain interactive to the user even while validation or conversion is in progress on the server. Multiple validations can be tied to a web component, with some of the validations occurring more quickly than other validations. Moreover, each validation may be called in turn but it is not necessary to wait for validation completion to accept field input. In some scenarios, during data input by a user, the field or fields used to receive input remain interactive, while the errors may be shown as they come back from the server without waiting for all validations to complete. Thus, with processes described herein, handling of user input, an input field can remain interactive to the user while the processor is processing previous user input, even from that same input field.

Embodiments described herein provide a method for adding an attribute to a web component where the attribute specifies what kind of validation or formatting conversion the component should perform. Each web component in the library, when this attribute is added, may automatically get the capability to synchronously and/or asynchronously validate or format user input according to the value specified by the attribute. Once the validation or formatting conversion is completed, the user will see the result in a user-friendly way. While the validation or conversion is being processed on the server, the user will still have the ability to interact with the web component.

Implementations described herein may also handle multiple user inputs. For example, the user may quickly edit the value they have entered multiple times, potentially triggering multiple validation or formatting conversion events to the web service. In some implementations, a data entry process, such as an asynchronous validator or a converter, may be configured to handle some or all of these user inputs, select an input to validate or convert (e.g., the last validation) while ignoring other inputs, and display the validation or conversion result of the latest user entry of a series (i.e., a sequential set) of user entries.

A further understanding of the nature and the advantages of particular embodiments disclosed herein may be realized by reference of the remaining portions of the specification and the attached drawings.

DETAILED DESCRIPTION OF EMBODIMENTS

Figure 1:
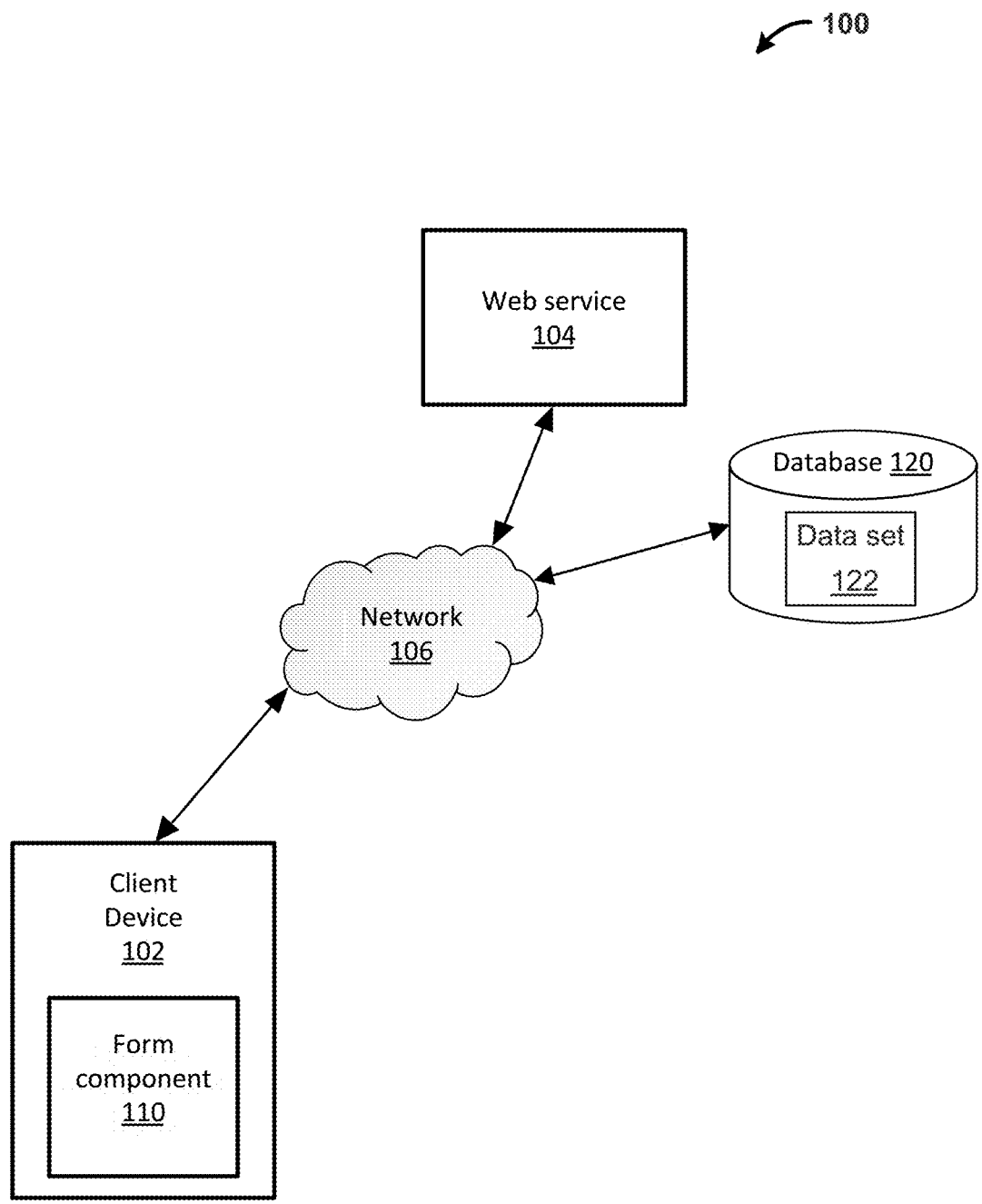
FIG. 1 illustrates a block diagram of the validation process on an example client device.

Implementations generally relate to a method of adding processing validation and conversion capabilities, such as asynchronous validation processing and conversion, and input data error tolerance to data entry processing interfaces, such as web components, forms, etc. in order to allow the user to interact with such data entry processing interface while data processing is underway for previous data entry inputs. As described in more detail herein, combinations of synchronous and asynchronous validation and conversion capabilities can be added to processing components by adding one or more attributes and processing logic to the existing component. Such attributes will specify what type of validation or formatting conversion is expected (e.g. validating to ensure a number is within a certain range, or formatting a number to show $10,000.00 instead of 10000, for example). The processing component may provide feedback on errors or changes in an interactive fashion for the user based on, for example, web service data. In some implementations, feedback is provided to a user asynchronously, without waiting for all user inputs to be validated or converted before displaying the errors or changes to the user. To reduce or eliminate processing latency that may be noticeable to a user, the processing component may be configured to remain completely interactive to the user even while validation or conversion is in progress on the server. Furthermore, the component may handle multiple user inputs and display the validation or conversion results from a selected entry, such as the last user input.

In other implementations, to provide for processing flexibility and efficiency such validation processes and/or conversion capabilities may be implemented when one or more processing delay thresholds have been met. For example, a data processing system may process validations and/or conversions synchronously until a threshold value or range of values has been met, at which point asynchronous validation processes and/or conversion capabilities may be initiated.

Implementations described herein provide a Graphical User Interface (GUI) which enables users, such as developers, to define common requirements for synchronous and asynchronous validation and data input conversion processes and/or to define device specific requirements for data input to be validated or converted relative to one or more error tolerance thresholds, and/or to test the validation processes automatically according to some implementations, in a convenient way.

Implementations described herein provide a GUI, for example, as a data entry user interface to accept user-provided data inputs. The data entry user interface is configured to prevent user interaction with the data entry user interface during data entry processing of the user-provided data inputs. In response to an attribute, the user interaction is decoupled from the data entry processing of the user-provided data inputs to allow the user interaction with the data entry user interface to continue during the data entry processing for the user-provided data inputs. A result of the data entry processing is displayed in the GUI.

FIG. 1 illustrates a high-level block diagram of an example data input processing system 100, which may be used for implementations described herein. Shown is a client device 102, web service 104, and database 120. Client device 102, web service 104, and database 120 may communicate with each other via a network 106. In various implementations, client device 102 may access services and data directly from web service 104. In addition, in some other implementations, client device 102 includes, for example, a GUI for receiving input from one or more users, which may include the UI components generated by form component 110. Example implementations associated with data input processing system 100 are described in more detail herein.

Data input processing system 100 may be any type of computing and/or data processing system, such as an enterprise computing environment, client-server system, and the like. Data input processing system 100 may be configured to process data received from a user interface, such as a keyboard, mouse, etc., with regard to processes such as determining, differentiating and converting types of entered data, generating, configuring, modeling, labeling, data binding, maintenance, etc., associated with data elements, applications, information, and the like as described herein.

Note that data input processing system 100 presents a particular example implementation, where computer code for implementing embodiments may be implemented, at least in part, on a server. However, embodiments are not limited thereto. For example, a client-side software application hosted for example, on client device 102, may provide data input processing system 100, or portions thereof, in accordance with the present teachings without requiring communications between the client-side software application and a server.

In one exemplary implementation, data input processing system 100 may be communicatively connected to a display configured to display data, for example, to a user thereof. Displays, screens, and the like as described herein may be a passive or an active display, adapted to allow a user to view and interact with graphical data displayed thereon, via the user interface. In other configurations, a display may be a touch screen display responsive to touches, gestures, swipes, and the like for use in interacting with and manipulating data by a user thereof. Gestures may include single gestures, multi-touch gestures, and other combinations of gestures and user inputs adapted to allow a user to validate input data, convert input data, model, analyze errors, deploy schemas, maintain data, etc.

In some implementations, data input processing system 100 may include a data source such as database 120. Database 120 may be one or more databases connected to data input processing system 100 directly or indirectly, for example via network connection 106, and may be implemented as a non-transitory data structure stored on a computer readable medium, such as a hard drive, Solid State Drive (SSD), flash memory, and the like, or may be stored as a part of a Cloud network, as further described herein.

Databases 120 may contain data sets 122. Data sets 122 may include data as described herein. Data sets 122 may also include data pertaining to validating and converting data, application code, data attributes, data models, data structures, data hierarchy, nodal positions, values, value types, summations, visualizations, algorithms, code (e.g., C++, JSON, JavaScript, XSD, XML, etc.), source, security, hashes, and the like. In addition, data sets 122 may also contain other data, data elements, and information such as metadata, labels, processing latency information, run-time information, user configuration information, API, interface component information, library information, error threshold data, pointers, and the like.

In exemplary implementations, data input processing system 100 may be adapted to receive data from user interface and/or database 120 for processing thereof. In one configuration, data input processing system 100 may be a software engine configured to receive and process input data, such as data validation parameters, conversion parameters, etc., from a user thereof pertaining to data received from a user interface and/or database 120 in order to examine entered data, differentiate between types of validation and/or conversion, and process the data entry relative to a validation and/or conversion schema and error thresholds. For example, during data entry validation, data input processing system 100 may identify validation errors, conversion errors, latency issues, etc.

Moreover, data input processing system 100 may be used to determine whether errors in the validation and/or conversion are within acceptable thresholds, levels, etc., where some validation error and/or conversion thresholds may be set for benign errors and/or for other types of user and/or system acceptable errors, thereby providing for an adjustable data validation and/or conversion tolerance.

For example, data input processing system 100 may allow for data validation and conversion with an acceptable threshold level of errors, such as errors of certain types, acceptable errors, UI errors, spelling errors, symbol errors, software code errors, reference errors, and the like. Data input processing system 100 may also be used to correct and resolve such errors or on the fly, with or without warnings given to a user thereof, in a recursive manner, for example, by using techniques such as data comparison, spell checking, solving references, assigning target "QNames," specifying relative routes, etc.

Data input processing system 100 in other implementations may be configured as a data analysis tool to perform analysis functions associated with data received from a user, for example. Such analysis functions may include using analysis of data attributes and/or other factors to determine and differentiate between critical and non-critical validation and conversion errors, benign errors, user defined errors, and the like. The analysis may also include determining the attributes associated with data, determining the type of data, types of validation and conversion schemas needed, determining the values of the data, data types, determining the relationships to other data, interpreting metadata associated with the data, determining error types, tolerance levels, and the like.

For example, data input processing system 100 may be configured to receive and analyze attributes of data sets 122 to determine asynchronous and synchronous validation requirements, determining data processing latency, web application values, key/value pairs, string identifiers, data properties, types of errors, error tolerance levels, schema types, user interface configuration, definitions, data processing instructions, data attributes, data hierarchy, nodes, nodal positions within the hierarchy, values, data type, summations, algorithms, source, security, hashes, and the like, associated with data sets 122.

Data input processing system 100 may receive existing data sets 122 from database 120 for processing thereof. Such data sets 122 may include and represent a composite of separate data sets 122 and data elements pertaining to, for example, organizational data, which may include data such as financial data, employment data, salary data, personnel data, and the like. In addition, data sets 122 may include other types of data, data elements, and information such as contact data, sales data, production data, scientific data, financial data, medical data, census data, and the like.

Data input processing system 100 may be configured to receive configuration data pertaining to data, associated data sets 122, and other data associated with data such as user interface components, icons, user pointing device signals, and the like, used to render data on a display. In one exemplary implementation, data input processing system 100 may be configured to render 2D and 3D graphical models and simulations to allow a user to obtain more information about data sets 130 associated with data. In one implementation, upon receiving instruction from a user, for example, through a user interface, a portion of data input processing system 100 may be configured to generate a real-time display of interactive changes being made to data selected by a user thereof.

Figure 2:
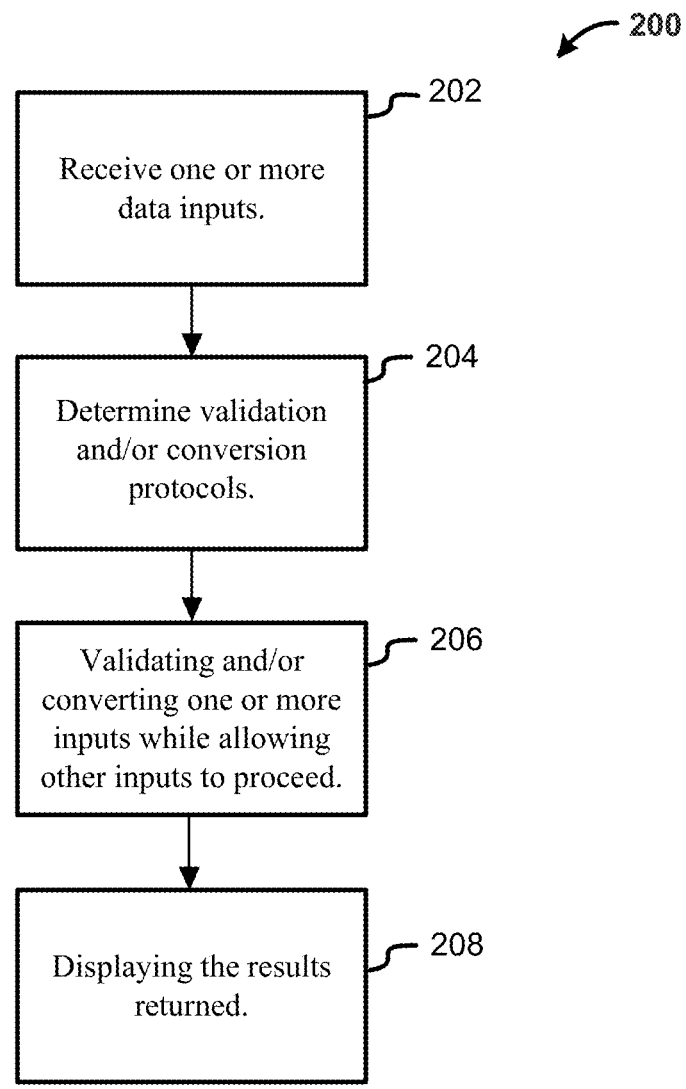
FIG. 2 illustrates a high-level flowchart showing the process of validation or conversion.

FIG. 2 illustrates an example flow diagram for a method 200 to employ a processing component, such as a web component, to perform validation or conversion. At 202, a system such as client device 102 obtains user-provided data input from form component 110, or the like, that provides a GUI etc. for accepting input data.

At 204, method 200 determines asynchronous validation and/or conversion protocols. In one implementation, in response to such processing input, method 200 may initiate asynchronous validation and/or conversion. In this scenario, method 200 may determine based on a latency threshold that the latency of the validation or conversion would likely be noticeable to a user.

In other implementations, at 204, method 200 may analyze the latency of the validation and/or conversion to see whether to implement synchronous or asynchronous validation and/or conversion. For example, method 200 may analyze validation or conversion latency and determine that synchronous validation or synchronous conversion is preferred based on factors such as latency amount, processor efficiency, types of processors available (e.g., multicore processors, etc.). In this scenario, synchronous validation or synchronous conversion may remain in effect until one or more thresholds are crossed.

At 206, in one implementation method 200 employing the client device 102 then uses web service 104 over network 106 to validate or convert the user-provided input. In one implementation, if there are multiple user-provided data inputs provided at different times, a predetermined user input, such as the most recent user-provided input, may used for validation or conversion. More detail on handling multiple user-provided data inputs is described in FIG. 6 and the related description. In some implementations, client device 102 may contact web service 104 via an application programming interface (API).

At 208, the result from web service 104 may be received on the client device 102 and displayed, for example, to a user.

Figure 3:
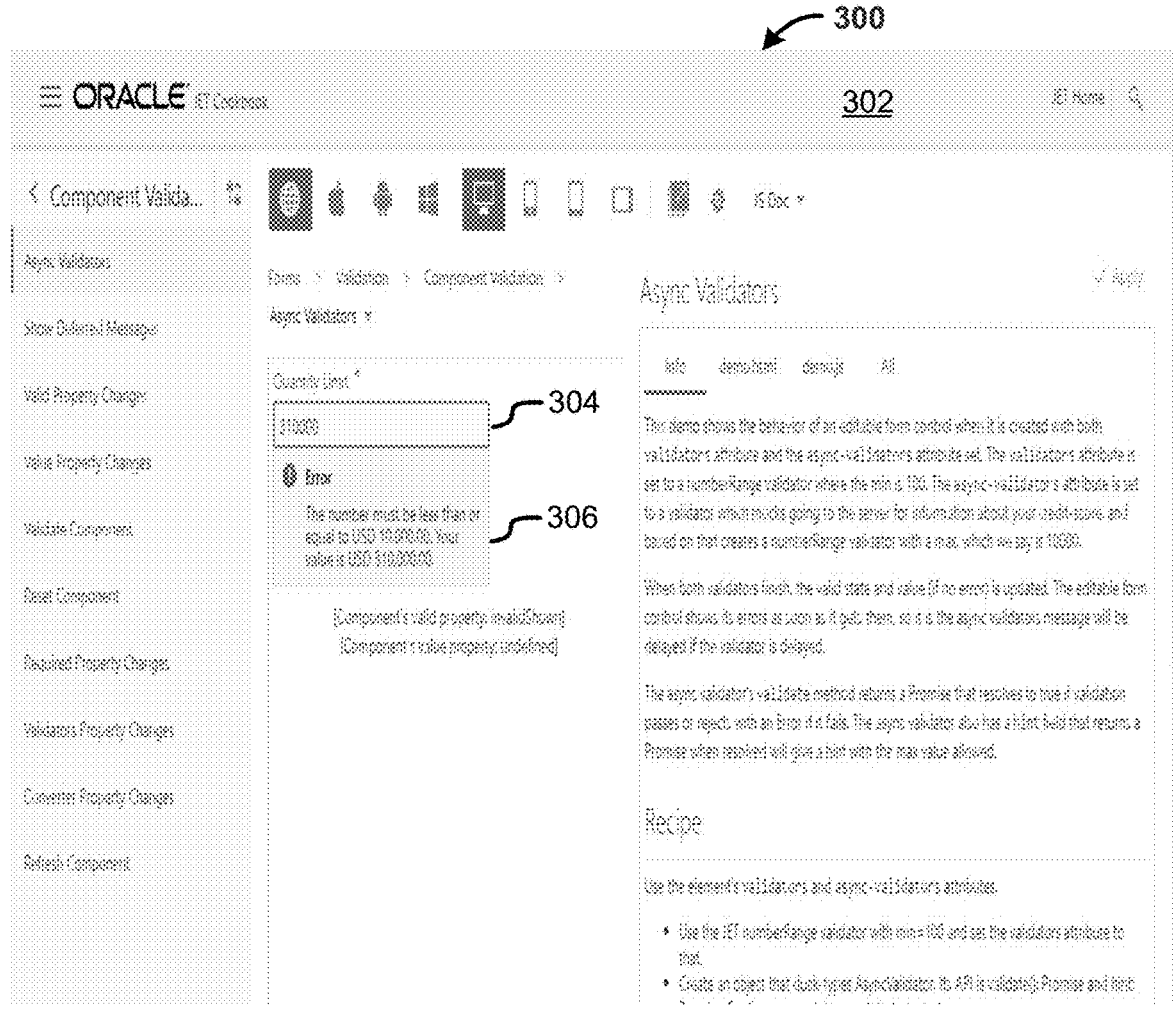
FIG. 3 illustrates an example error message when validation fails.

FIG. 3 shows a screenshot 300 demonstrating the functionality of a web component functioning via a GUI 302 employed by data input processing system 100 configured with an asynchronous validation process, when the user-provided input is deemed invalid, for example, by crossing one or more invalid data thresholds. In implementations, if the user-provided input 304 to the form component 110 does not pass validation, an error message 306 may be automatically shown to the user with details of the validation failure.

As discussed above, such validation process may be configured to tolerate a predetermined level of validation errors. For example, as shown in FIG. 3, a user input of "310000" was determined to be outside the validation range of "less than or equal to $10,000.00." However, the system in this scenario ignored the user not entering the decimal amount or the comma after "31." Thus, validation error thresholds may be employed to configure data input processing system 100 to be more or less lenient to data input.

Figure 4:
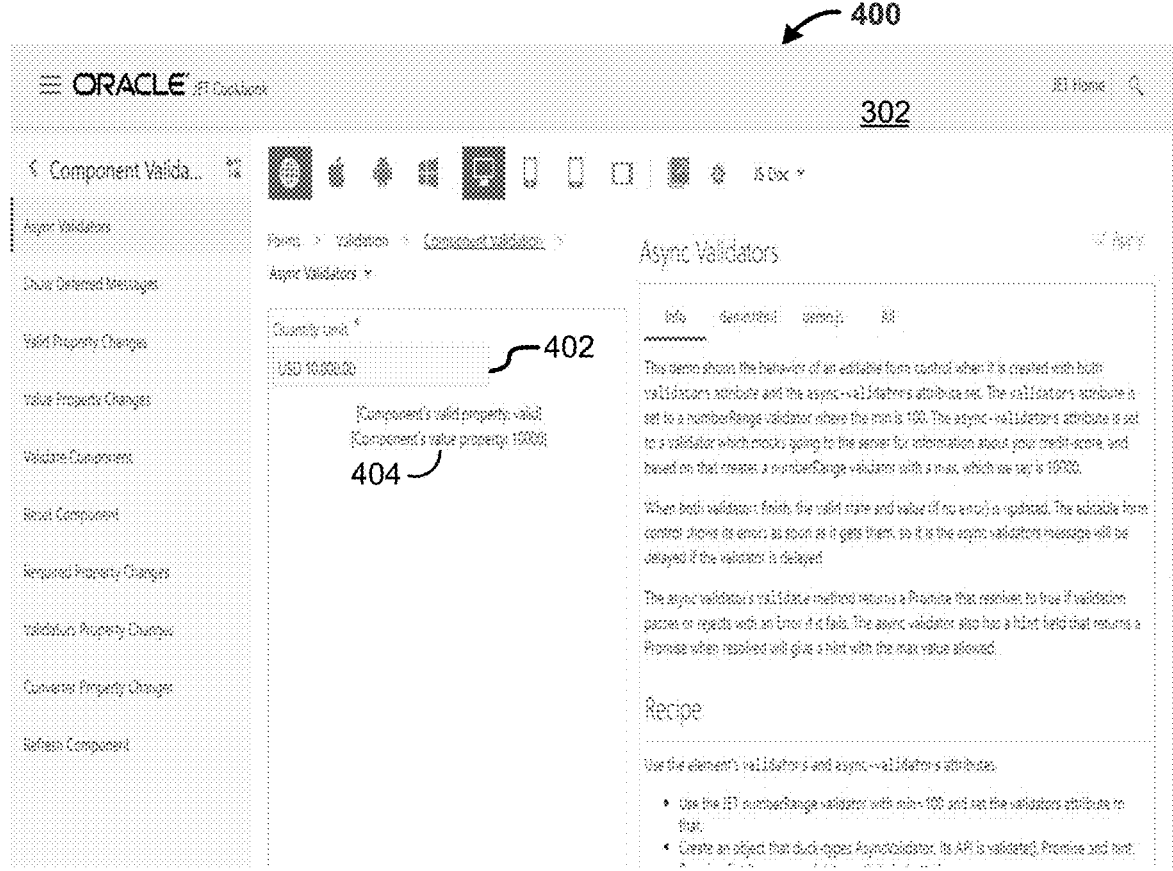
FIG. 4 illustrates an example message when validation passes.

FIG. 4 illustrates a screenshot 400 demonstrating the functionality of a web component via a GUI 302 employed by data input processing system 100 configured with asynchronous validation when the user-provided input is valid. In implementations, if the user-provided input 402 to the form component 110 passes validation, for example, by crossing one or more valid data thresholds, no error message will be shown, and the user-provided input may be formatted according to validation attributes 404. In this example, the user-provided input 402 is formatted to show "USD 10000.00" instead of "10000".

As discussed herein, such validation process may be configured to tolerate a predetermined level of validation errors. For example, as shown in FIG. 4, a user input of "10,000" was determined to be equal to or less than the validation range of $10,000.00. However, the system in this scenario ignored the user not entering the decimal amount. Thus, validation error thresholds may be employed to configure data input processing system 100 to be more or less lenient to data input.

Figure 5:
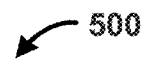
FIG. 5 illustrates an example conversion.

FIG. 5 shows a screenshot 500 demonstrating example functionality of a web component employing an asynchronous conversion process. Web components can be configured with different settings (e.g. "style": "decimal", "maximumFractionDigits": "1") and the user-provided input may be automatically converted based on one or more configuration settings. The examples mentioned here are only examples and do not represent all of the options for conversion. For example, converter 502 may be configured to convert between a number and a locale specific string displayed in currency format, or between a locale specific date string and a Date value, or between color representations such as RGB to HSV, etc. Converter 502 may also be customized to convert to and from other types not mentioned here.

As discussed herein, such conversion process may be configured to tolerate a predetermined level of conversion errors. For example, as shown in FIG. 5, an input of ere.

As discussed herein, such conversion process may be configured to tolerate a predetermined level of conversion errors. For example, as shown in FIG. 5, an input of "123.476" may be processed by converter 502 with a "short" decimal which would automatically ignore the error and roundup to a short number of decimal. Alternatively, data input processing system 100 may be configured to allow for "long" decimal formats. Thus, conversion error thresholds may be employed to configure data input processing system 100 to be more or less lenient to data input.

Figure 6:
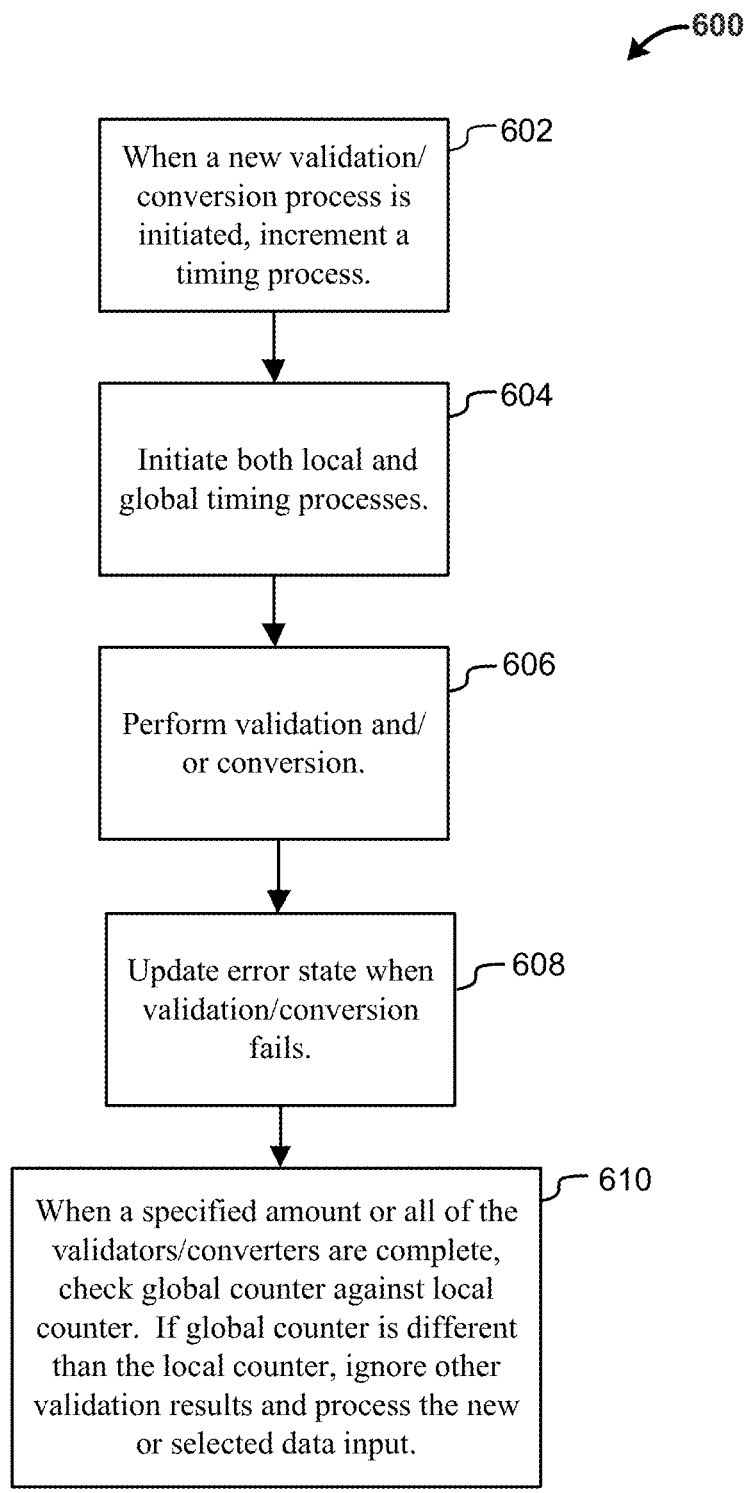
FIG. 6 illustrates an example of handling multiple asynchronous inputs for validation or conversion.

FIG. 6 illustrates an example high-level flow diagram providing a method 600 employing a web component to handle multiple asynchronous (e.g., async) inputs for validation or conversion. At 602, method 600 employing, for example, client device 102, obtains user-provided input from a GUI input such as form component 110. In some implementations, whenever such input is provided, a timing process may be incremented to determine which asynchronous input was in a particular position in time. For example, a series of sequential inputs would each have a different time period of input (i.e., position in time) relative to the other inputs in the series. Such timing process may be a counter or other device detecting and/or determining processing latency, data entry timing points, etc.

In implementations, at 604, method 600 initiates one or more timing processes for each data entry instantiation. For example, method 600 may initiate a local timing process for each separate input and a global timing process to be used to compare to one or more local timing processes, compare the timing of inputs from different users, etc.

At 606, method 600 employing, for example, client device 102, invokes a validation and/or conversion process to perform validation and/or conversion of data input. For example, method 600 may initiate web service 104 over network 106 to validate or convert the user-provided input. At this juncture, as described herein, a validation and/or conversion error threshold may be used to allow such validation and/or conversion to be data input tolerant to one or more specified levels.

At 608, if a validation or conversion fails at least one error threshold, an error state may be updated. For example, at least one user may enter a first data input, then immediately enter a second data input into the same data entry interface, e.g., GUI. If method 600 determines that the error was for the first validation, method 600 may ignore the first data input and validate or convert the second data input.

In one implementation, at 610, when all or a specified number of validators/converters processes have completed, the global timing process, e.g., global counter, may be compared against the local timing process, e.g., local counter. If the global timing process is different than the local timing process, this means that a new validation or conversion input has been entered. If so, method 600 may ignore all or a specified number of validation results and process the new or selected data input.

In implementations, the algorithm as described in FIG. 6 is configured to reduce or prevents scenarios illustrated by the following example: a user may enter input "100.0" for validation. Validation for this input may happen slowly, and the user may enter input "200.0" before the validation on the first input completes. Validation for the second input may happen quickly and return before the result of the first validation comes in. Using the algorithm as described in FIG. 6 will result in a validation error for the second input, instead of with the first, even though the result of the first input returned later. Effectively, under this implementation, method 600 helps to ensure that validation or conversion results are returned for the most recent or specified user input.

In other scenarios, such validation or conversion may be based on another criteria such as the first date entry that is within the error threshold. In an example, a user may enter "10,000" then "$10,000" in a system with an error tolerance that accepts either entry. In this example, method 600 may take the first entry and ignore the second entry, as both are valid. In doing so, method 600 may improve processing efficiency and/or speed by ignoring other valid entries that may be superfluous.

Figure 7:
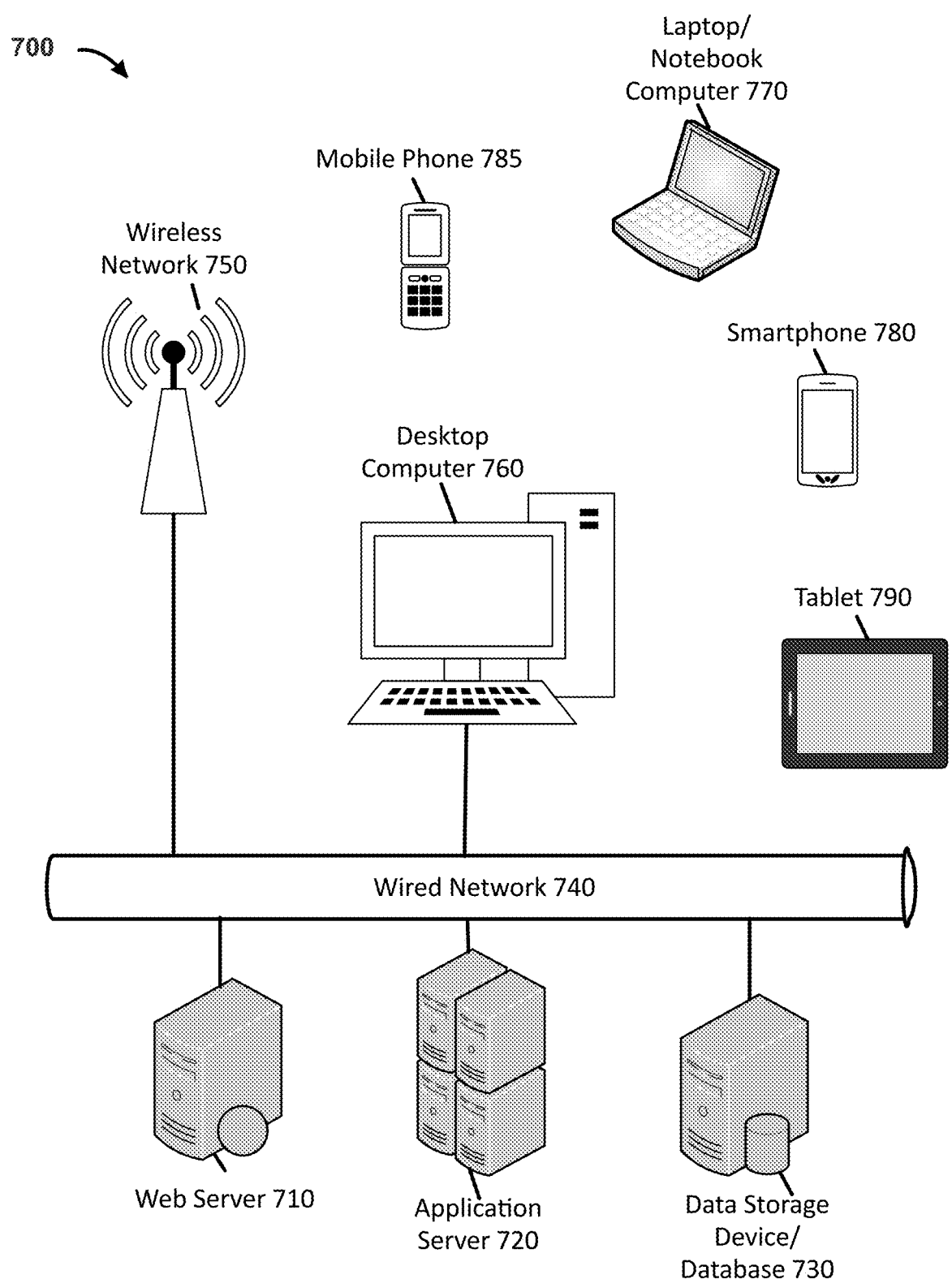
FIG. 7 illustrates a high-level block diagram of an example system, which may be used for implementations described herein.

FIG. 7 illustrates a block diagram of an example system 700, which may be used for implementations described herein. Example system 700 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 700 performs implementations described herein, in other implementations, any suitable component or combination of components associated with system 700 or any suitable processor or processors associated with system 700 may facilitate performing the implementations described herein. In various implementations, system 700 may not have all of the components shown and/or may have other elements including other types of components instead of, or in addition to, those shown herein.

General system 700 includes user devices 760-790, including one or more desktop computers 760, one or more notebook computers 770, one or more smartphones 780, one or more mobile phones 785, and one or more tablets 790. General system 700 can interface with any type of user device, such as a thin-client computer, Internet enabled mobile telephone, mobile Internet access device, tablet, electronic book, or personal digital assistant, capable of displaying and navigating web pages or other types of electronic documents and UIs, and/or executing applications. Although system 700 is shown with five user devices, any number of user devices can be supported.

A web server 710 is used to process requests from web browsers and standalone applications for web pages, electronic documents, enterprise data or other content, and other data from the user computers. Web server 710 may also provide push data or syndicated content, such as RSS feeds, of data related to enterprise operations.

An application server 720 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 720 are adapted to process input data and user computer requests and can store or retrieve data from data storage device or database 730. Database 730 stores data created and used by the data applications. In some implementations, database 730 includes a relational database that is adapted to store, update, and retrieve data in response to SQL format commands or other database query languages. Other implementations may use unstructured data storage architectures and Not Only SQL (NoSQL) databases.

In some implementations, application server 720 includes one or more general purpose computers capable of executing programs or scripts. In some implementations, web server 710 is implemented as an application running on the one or more general purpose computers. Web server 710 and application server 720 may be combined and executed on the same computers.

An electronic communication network 740-750 enables communication between user computers 760-790, web server 710, application server 720, and database 730. In some implementations, networks 740-750 may further include any form of electrical or optical communication devices, including wired network 740 and wireless network 750. Networks 740-750 may also incorporate one or more local-area networks, such as an Ethernet network, wide area networks, such as the Internet; cellular carrier data networks; and virtual networks, such as a virtual private network.

System 700 is one example for executing applications according to some implementations. In some implementations, application server 710, web server 720, and optionally database 730 can be combined into a single server computer application and system. In further implementations, virtualization and virtual machine applications may be used to implement one or more of application server 710, web server 720, and database 730.

In still further implementations, all or a portion of the web and application serving functions may be integrated into an application running on each of the user computers. For example, a JavaScript application on the user computer may be used to retrieve or analyze data and display portions of the applications.

In various implementations, system 700 may not have all of the components shown and/or may have other elements including other types of components instead of, or in addition to, those shown herein.

Figure 8:
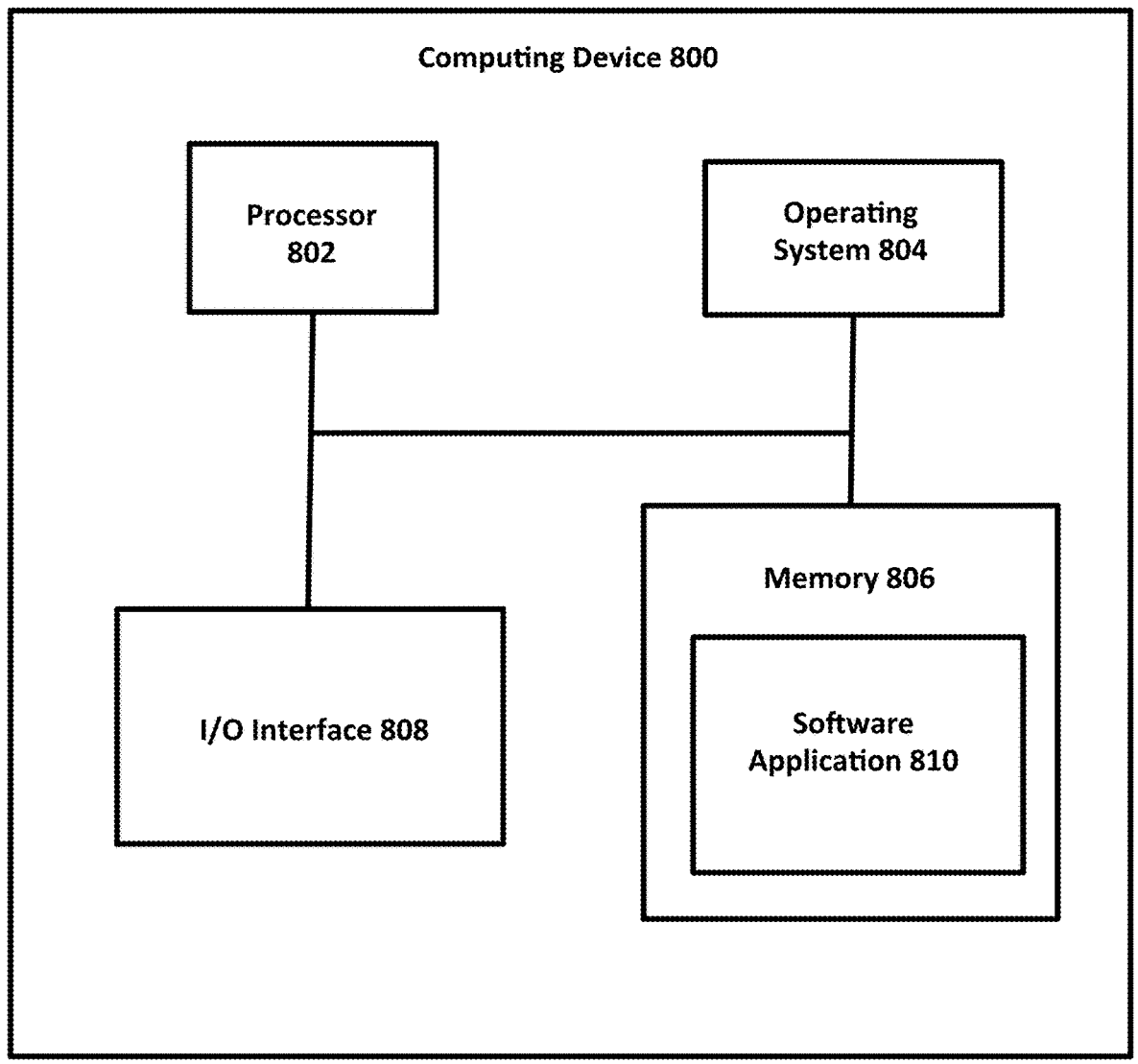
FIG. 8 illustrates a high-level block diagram of an example network environment, which may be used for implementations described herein.

FIG. 8 is a general block diagram of a computing device 800 usable to implement the embodiments described herein. As an example, the computing device 800 may be configured to implement at least part of the input validation process 200 as shown in FIG. 2. Alternatively or in addition, the computing device 800 may be configured to implement at least part of the user interfaces as shown in FIGS. 3-5. While the computing device 800 of FIG. 3 may be described as performing one or more of the steps in the embodiments herein, in other embodiments any suitable component or combination of components of the computing device 800 or any suitable processor or processors associated with system 800 may facilitate performing the steps.

FIG. 8 illustrates a block diagram of an example computing device 800, which may be used for implementations described herein. For example, computing device 800 may be used to implement user devices 760-790, and server devices 710, 720 of FIG. 7 as well as to perform the method implementations described herein. In some implementations, computing device 800 may include a processor 802, an operating system 804, a memory 806, and an input/output (I/O) interface 808. In various implementations, processor 802 may be used to implement various functions and features described herein, as well as to perform the method implementations described herein. While processor 802 is described as performing implementations described herein, any suitable component or combination of components of device 800 or any suitable processor or processors associated with device 800 or any suitable system may perform the steps described. Implementations described herein may be carried out on a user device, on a server, or a combination of both.

Computing device 800 also includes a software application 810, which may be stored on memory 806 or on any other suitable storage location or computer-readable medium. Software application 810 provides instructions that enable processor 802 to perform the functions described herein and other functions. The components of computing system 800 may be implemented by one or more processors or any combination of hardware devices, as well as any combination of hardware, software, firmware, etc.

For ease of illustration, FIG. 8 shows one block for each of processor 802, operating system 804, memory 806, I/O interface 808, and software application 810. These blocks 802, 804, 806, 808, and 810 may represent multiple processors, operating systems, memories, I/O interfaces, and software applications. In various implementations, computing system 800 may not have all of the components shown and/or may have other elements including other types of components instead of, or in addition to, those shown herein.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory processor-readable storage device for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory computer readable medium including one or more instructions executable by one or more processors for a method providing asynchronous General User Interface (GUI) input, the method comprising:
    receiving a first user-provided input for an input field of the General User Interface (GUI);
    initiating a first local timing process and a global timing process indicating time of the receiving of the first user-provided input;
    prior to completion of data entry processing of the first user-provided input, receiving a second user-provided input for the input field and initiating a second local timing processing indicating time of the receiving of the second user-provided input for the input field;
    performing data entry processing of the first user-provided input and the second user-provided input;
    choosing between the first user-provided input and the second user-provided input for use of the input field based at least in part on the first local timing process, the second local timing process, and the global timing process;
    determining that the second user-provided input failed at least one of validation processing and conversation processing; and
    using the first user-provided input for the input field.

2. A non-transitory computer readable medium as recited by claim 1, wherein the method further comprises:
    determining that both the first and second user-provided input are valid and convertible; and
    using the second user-provided input for the input field, wherein the second user-specified input was received after the first user-specified input.

3. A non-transitory computer readable medium as recited by claim 1, wherein the method further comprises:
    determining that the data entry processing for the second user-provided input returned before the data entry processing of the first user-provided input;
    determining that the second user-provided input is not valid or is not convertible; and
    using the first user-specified input for the input field.

4. A non-transitory computer readable medium as recited by claim 1, wherein the data entry processing is selected from a group consisting of validation and conversion.

5. A non-transitory computer readable medium as recited by claim 4, wherein one or more configuration settings including style, decimal, and maximumFractionDigits is used in the conversion.

6. A non-transitory computer readable medium as recited by claim 1, wherein the method further comprises:
    determining, based on latency of the data entry processing, to provide a General User Interface (GUI) input selected from synchronous General User Interface (GUI) input and
    synchronous General User Interface (GUI) input.

7. A non-transitory computer readable medium as recited by claim 6, wherein the method further comprises:
    determining whether to provide GUI input based on one or more factors including latency amount, processor efficiency, type of one or more processors, wherein the GUI input is selected from one of asynchronous GUI input and synchronous GUI input.

8. A non-transitory computer readable medium as recited by claim 6, wherein the method further comprises:
    determining the latency based on whether the data entry processing is performed locally or remotely.

9. A non-transitory computer readable medium as recited by claim 6, wherein the method further comprises:
    determining whether the data entry processing is within an acceptable threshold of errors with respect to the first user-provided input and the second user-provided input; and
    determining which of the first user-provided input and the second user-provided input to use for the input field based on the determining of whether the data entry processing is within the acceptable threshold of errors with respect to the first user-provided input and the second user-provided input.

10. A method for providing asynchronous General User Interface (GUI) input, the method comprising:
    receiving a first user-provided input for an input field of the General User Interface (GUI);

initiating a first local timing process and a global timing process indicating time of the receiving of the first user-provided input;

prior to completion of data entry processing of the first user-provided input, receiving a second user-provided input for the input field and initiating a second local timing processing indicating time of the receiving of the second user-provided input for the input field;

performing data entry processing of the first user-provided input and the second user-provided input;

choosing between the first user-provided input and the second user-provided input for use of the input field based at least in part on the first local timing process, the second local timing process, and the global timing process;

determining that the second user-provided input failed at least one of validation processing and conversation processing; and using the first user-provided input for the input field.

11. A method as recited by claim 10, wherein the method further comprises:

determining that both the first and second user-provided input are valid and convertible; and using the second user-provided input for the input field, wherein the second user-specified input was received after the first user-specified input.

12. A method as recited by claim 10, wherein the method further comprises:

determining that the data entry processing for the second user-provided input returned before the data entry processing of the first user-provided input;

determining that the second user-provided input is not valid or is not convertible; and using the first user-specified input for the input field.

13. A method as recited by claim 10, wherein the data entry processing is selected from a group consisting of validation and conversion.

14. A method as recited by claim 13, wherein one or more configuration settings including style, decimal, and maximumFractionDigits is used in the conversion.

15. A method as recited by claim 10, wherein the method further comprises:

determining, based on latency of the data entry processing, to provide a General User Interface (GUI) input selected from synchronous General User Interface (GUI) input and synchronous General User Interface (GUI) input.

16. A method as recited by claim 15, wherein the method further comprises:

determining whether to provide GUI input based on one or more factors including latency amount, processor efficiency, type of one or more processors, wherein the GUI input is selected from one of asynchronous GUI input and synchronous GUI input.

17. A method as recited by claim 15, wherein the method further comprises:

determining the latency based on whether the data entry processing is performed locally or remotely.

18. An apparatus for providing asynchronous General User Interface (GUI) input, the apparatus comprising:

one or more hardware processors;

one or more non-transitory computer readable mediums including one or more instructions executable by the one or more processors for a method comprising:

receiving a first user-provided input for an input field of the General User Interface (GUI);

initiating a first local timing process and a global timing process indicating time of the receiving of the first user-provided input;

prior to completion of data entry processing of the first user-provided input, receiving a second user-provided input for the input field and initiating a second local timing processing indicating time of the receiving of the second user-provided input for the input field;

performing data entry processing of the first user-provided input and the second user-provided input;

choosing between the first user-provided input and the second user-provided input for use of the input field based at least in part on the first local timing process, the second local timing process, and the global timing process;

determining that the second user-provided input failed at least one of validation processing and conversation processing; and using the first user-provided input for the input field.

* * * * *